2,868,715

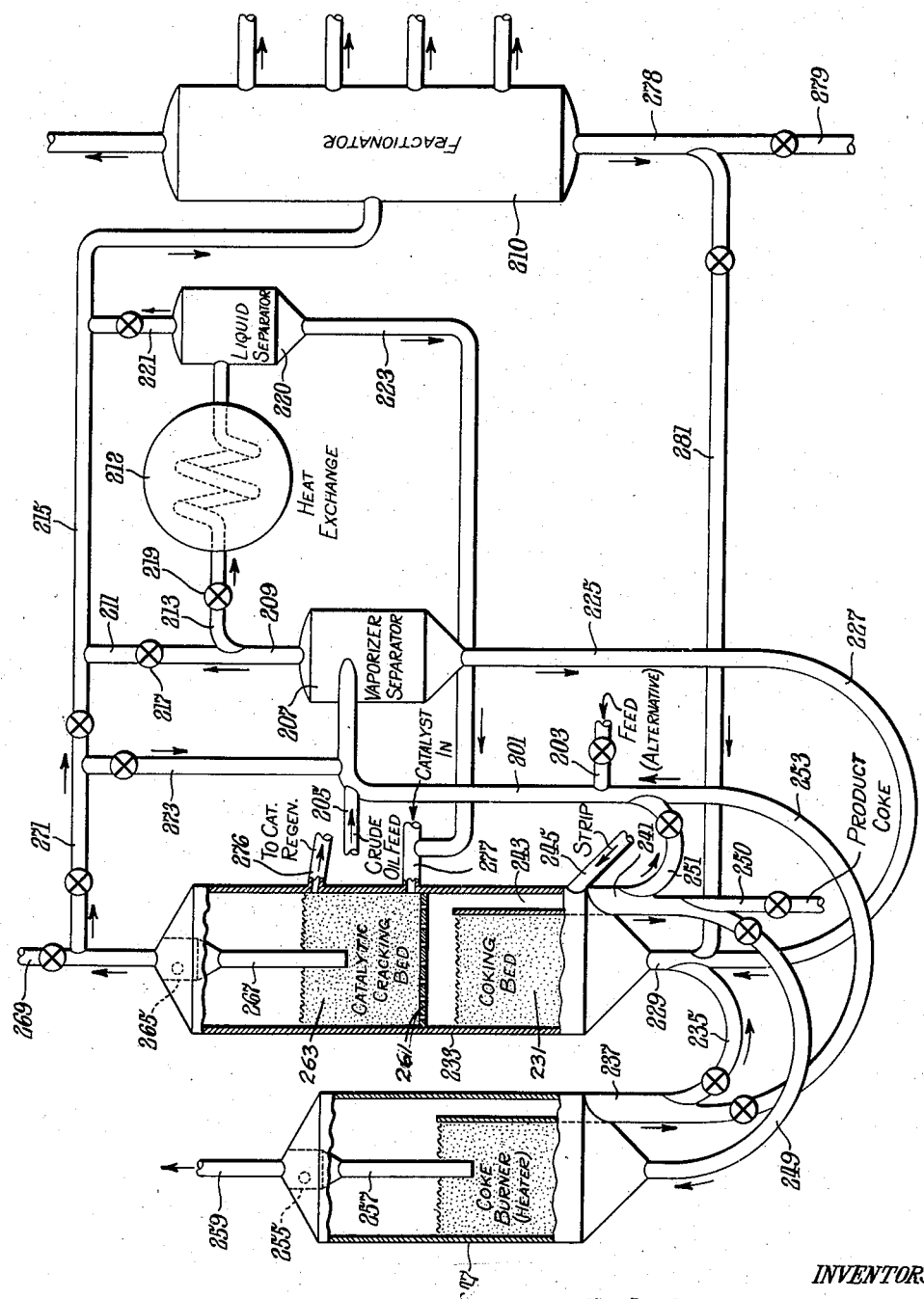

PROCESS AND APPARATUS FOR CONVERSION OF HYDROCARBON OILS

Charles E. Jahnig, Red Bank, James W. Brown, Elizabeth, and Homer Z. Martin, Cranford, N. J., assignors to Esso Research and Engineering Company, a corporation of Delaware Application August 25, 1953, Serial No. 376,338

5 Claims. (Cl. 208—55)

The present invention relates to a process and apparatus for conversion of hydrocarbon oils. It relates more particularly to a process and apparatus for conversion of crude petroleum oil, wherein the feed is initially vaporized by contacting it with hot particulate solids and the solids so contacted, carrying a residual fraction of the feed, are further treated by coking. The invention has special application to whole crude oils but it is applicable also to topped crudes and other feeds which contain substantial proportions of components of the gas oil boiling range, i. e. 430 to 1050° F.

The invention has particular application to the conversion of crude petroleum oil without the conventional initial atmospheric or vacuum distillation operation, although it can also be applied to a feed stock that has been topped by such an operation. By means of the present invention atmospheric stills and/or vacuum stills can be eliminated in many cases. In other cases the operational or quantitative requirement for such stills can be greatly reduced, i. e. they can be reduced in capacity.

A combination coking and cracking operation in a single vessel (dual zone) is taught and the products of this dual treatment may be used also to assist in initial vaporization.

In the prior art, it has been recognized that it is desirable to fractionate the original feed as far as practicable and to reduce the final residuum to as low a total volume as possible. However, when distillation temperatures are higher than about 800° F. maximum, there is high conversion of the feed to gas and considerable degradation to coke. In fact, a topping temperature above about 750° F. is usually considered detrimental. When topping or distillation temperatures, by prior art methods, are kept down to 750° F., or even down to 800° F., the resulting gas oil production is relatively low and residuum is high in volume.

According to the present invention, the feed can be vaporized at a substantially higher temperature, with resulting increase in gas oil yield, with decrease in total residuum, and with relatively low production of gas and coke, by first vaporizing the feed by contacting it with finely divided solid particles. Suitable particulate material may be sand, clay, spent catalyst, metal shot, glass or ceramic beads and the like. Any relatively inert non-catalytic material of suitable particle size can be used if it has good heat transfer properties. Coke particles within the range of about 40 to 400 microns average diameter are usually preferred because some coke is made in the process. The use of coke obviously makes it unnecessary to bring in extraneous material but other solids, as listed above, are quite satisfactory when they can be used economically.

The invention therefore includes the operation of vaporizing or distilling the feed by contacting it with a sufficient quantity of heated solid particles that the products boiling up to or somewhat above the treatment temperature are distilled or vaporized and taken out of the system. Those of higher boiling range are deposited in liquid phase, or as coke, on the solid particles. The ratio of solids to feed should be sufficiently high that the liquid products deposited thereon do not make the particles sufficiently tacky to adhere with each other and agglomerate or cause bogging, i. e. the bed is kept relatively dry by an adequate solids feed rate. By this technique, instead of limiting the topping or initial distillation operation or operations to a maximum temperature of 750° to 800° F., as has been necessary in many prior operations, the flash or vaporization temperature may be increased to a maximum of about 1100° F. Generally, a vaporization temperature of 850° to 1000° F. is preferred since, for reasons pointed out below, vaporization in the process of this invention can be further enhanced or the gas oil cut may be taken deeper into the feed stock by passing the products of the coking and/or subsequent catalytic cracking through the vaporization zone to reduce partial pressure of the high boiling ends. In some cases it is desirable to limit the vaporization temperature to about 900° F. maximum. By the use of additional techniques described below, this will volatilize gas oil products of over 1000° and up to 1100° F. if desired.

The effective increase in flash temperature made possible by the use of hot solids in the distillation zone, according to the present invention, materially reduces the amount of the residue which is to be coked. The feed vaporization itself may result in some production of coke, with most feeds, but this coke is deposited upon the solid particles which supply the heat for the vaporization. These particles are heated to a temperature sufficient to effect vaporization at the desired maximum temperature. This temperature is usually 10° to 300° F. or more higher than the temperature in the vaporization zone.

The coke deposited upon the inert solids may be burned off, either in a bed or transfer line heater, and the heat therefrom may be utilized for various related or unrelated operations. When the inert solids themselves are coke particles, as is preferred, the coke produced may be taken out as a product or it may be consumed in the plant.

In conventional coking operations, where coking of a residuum is carried out in a coil, or a coil and drum apparatus, the conventional prolonged heating of the residuum to a temperature as high as 900° up to 1100° F. or more results in overcracking. The vaporized products, as well as the unvaporized products tend to be low in quality. Excessive amounts of coke are usually formed and deposited in the apparatus so that the coil and other apparatus elements become clogged. However, in a flash zone or vaporizer operated according to the present invention, and in the fluidized coking bed to which the residua are taken, no clogging of apparatus takes place and the overhead products are not degraded nearly to the same extent. The overhead products from the flashing zone (where they are contacted with the hot solids at 950 to 1400° F.) are still of relatively good quality because of the short time duration of the treatment. Other things being equal, this means that they are better catalytic cracking feed stocks than gas oils from conventional coking. They are not subject to excessive degradation to coke or to excessive production of gases (below C4) during the catalytic cracking operation which follows.

The gas oil from this process may be taken to storage or to a separate catalytic cracking operation. Alternatively, it may be cracked immediately in the same vessel or in a contiguous vessel.

According to the preferred embodiment of the present invention it is usually desirable to pass the coker overhead product or the catalytic cracker product when coker overhead is cracked, or preferably both, through the flash or vaporization zone. This will lower the vapor pressure of the heavy ends and facilitate distillation of the heavy gas oil and/or conversion of the residua to such. This is not always essential but it makes it possible, other conditions being unchanged, to take a gas oil of higher end point from the residuum without excessive thermal degradation. The feed may advantageously be preheated to say 300° to 600° F. although this is not necessary.

The proportion by weight of the particulate solids to the oil feed sent to the vaporizer is preferably between 5 and 50. With hot coke particles heated to about 1200° F., the ratio is preferably in the range of about 6 to 20. With a crude feed of high asphaltic residual content, the proportion of solids may need to be somewhat higher than in lighter crudes.

The contact time within the transfer line contact zone plus the time in the vaporized feed-solids separator, which is preferably a cyclone, is such as to effect substantially complete vaporization of products of the desired boiling range. E. g. with a 10 to 1 ratio of solids to feed, and a solids temperature of 1200° F., the flashing temperature will run between about 900° and 1000° F. and the contact time between about 0.5 and 5 seconds, more or less, depending upon temperature and ratio of solids to feed. It is desirable to keep this contact time short to avoid degradation of the virgin products. The solids, preferably coke particles between 40 and 400 microns average diameter, are carried upwardly.

The descending spent coke particles from stripping zone of the coking vessel may be divided into two streams, depending upon the heat balance and the operating characteristics desired. One stream, usually the larger, passes into a return line and back into the heater or burner for reheating and/or reactivation. The other stream passes through a U-bend or line into the conduit which constitutes the vaporizer or at least comprises the first and major part thereof. The flow through all these U-bends may be controlled in conventional manner, i. e. by valves or as described in the Packie U. S. Patent No. 2,589,124, as is well known in the art. The proportion of relatively hot solids and relatively cool spent solids sent to the vaporizer from the heater and coker, respectively, are individually controlled. By this means the temperature in the vaporization zone may be controlled independently of the solids feed rate.

Referring to the drawings, there is shown in integrated vaporization, coking and cracking system.

Crude oil, or mildly topped crude, is fed into a transfer line 201 through inlets 203 and/or 205. A stream of hot particulate solids, obtained as described hereinafter, is fed through the transfer line in the direction indicated by the arrows, and is contacted by the feed. These solids, as previously described, are brought into transfer line 201 at a predetermined elevated temperature, usually between 1000 and 1400° F. Their volume is such as to provide 5 to 25 pounds, preferably 6 to 20 pounds of hot particles per pound of feed. This is ample to vaporize the gas oil (up to 1015° F.) and lower boiling constituents of the feed and to cause some incipient cracking. The contact time is controlled by regulating the velocity of the particle stream in the transfer line, by choosing the transfer line length, and by selecting the point of feed injection, so as to keep contact time between about 0.5 and 5 seconds. It will be understood that in exceptional cases, the contact time may be slightly shorter or longer than these limits. It is not desirable to crack the virgin products appreciably. The solids and feed are passed into a cyclone type separator 207 and the contact times mentioned above include time of contact within this separator.

From separator 207 the vaporized products are carried overhead through a line 209 from whence they may be passed directly to a fractionator 210 through lines 211, 215 or to a cooler 212 through line 213 and then to fractionator. Control valves 217 and 219 are provided for directing or dividing the flow as desired. When the products are cooled in heat exchanger 212, the effluent which contains condensed heavy gas oil constituents may be passed through a gas-liquid separator shown herein as a centrifugal type separator such as cycline 220. From here the uncondensed vapors are taken overhead through a line 221 and into line 215 to the fractionator. The condensate is taken through line 223 to a catalytic cracking zone for conversion to motor fuel.

The solids, e. g. coke particles, carrying deposits of coke and residuum, are taken from separator 207 through a line 225 and U-bend 227 into the bottom inlet 229 of a coking zone 231 in a reactor vessel 233. Here they are mixed with hot solids, preferably coke particles coming through U-bend 235 and outlet 237 of a burner or heater. These hot solids, at a temperature of 1000° to 1400° F. or more, supply the necessary heat for the normally endothermic coking reaction.

The mixture of hot coke and the coke from the vaporizer separator, with its deposits of residuum, etc., is kept in the coking bed 231 for a residence time of 0.5 to 30 minutes, preferably 3 to 20 minutes. The temperature in this bed is between 850° and 1100° F., preferably between about 900° and 1000° F., where a gas oil of good quality for catalytic cracking to motor fuel is desired as the principal product. The bed is fluidized in part by the vaporous coker products and in part by extraneous inert gas or vapor such as steam, in a conventional manner. The spent coke in the bed overflows partition 241 into a stripping zone 243. Steam or other suitable stripping gas is fed into the stripper zone as at 245 to strip occluded gases and vapors from the descending coke stream therein. The stripped spent coke is returned, in part at least, to burner or heater 247 through a U-bend or equivalent 249. Here it is heated, either by passing oxygen or air, or other oxidizing gas upwardly through a bed of the coke, or by burning extraneous fuel therein, or both. As shown, heater or burner 247 is of the fluid bed type. This is the presently preferred arrangement but it will be understood that the burner may be a transfer line burner or, in some cases, heating of the particulate may be by indirect means. Coke produced in the process, in excess of operating requirements, is withdrawn from the system, e. g. through line 250.

A part of the coke in stripper 243 may be diverted through a line or U-bend 251 into the transfer line 201. Frequently such spent coke is at too low a temperature to supply the full heat requirements in the transfer line vaporizer and additional hot solids are brought in through U-bend 253 from burner or heater 247. In some cases, preheated coke only will be used, where heat requirements demand it.

The solids in the heater or burner are drawn off into the stripping zone or outlet 237 previously mentioned. At least part of the stream is led through U-bend 235 to supply hot coke to the coking bed 231. A portion is led through another line 253, when needed, to supply hot solids to the vaporizer as previously described. Occluded flue gases are stripped from the hot solid in stripper zone 237 in a conventional manner. The flue gases from the burner pass overhead through a cyclone 255 having a solids return line 257 and a gas outlet 259 as is well understood in the art.

Returning to the coker, the vapors from coker bed 231 pass upwardly through a grid or perforate transverse partition member 261. A fluid bed 263 of cracking catalyst is supported on this grid or partition. The coker vapors are immediately cracked and the cracked products are taken overhead through a cyclone 265 having a solids return line 267 and a vapor outlet 269. From the latter, the vapors may be taken to any suitable point of use. Preferably they are taken through a line 271 and line 273 into the transfer line vaporizer 201 to assist in vaporizing the gas oil and lighter constituents of the feed. In some cases, however, this may not be necessary or desirable and the products can be taken directly into fractionator 210 through line 215. Catalyst from bed 263 may be taken out through line 276 to a regenerator, not shown, and returned through a line 277. The gas oil liquid from separator 220 may be led through line 223 to mix with the regenerated catalyst in line 277.

The bottoms from refractionator 210 may, if desired, be withdrawn from the line 278 through outlet 279 or they may be returned through a line 281 to the coker, as will be obvious to those skilled in the art.

It will be understood that all of the lines described may be provided with control valves for direction, diversion and division of the streams as needed. By a proper adjustment of the valves in lines 251 and 253 the temperature of the solids in transfer vaporizer line 201 may be accurately controlled quite independently of the solids to oil feed ratio. The flow of cracked products from the catalytic cracking zone may be diverted partly or wholly through line 273 or 215, and the vaporized products from separator 207 may be divided or diverted in lines 211, 213, etc. Additionally, a portion of the coker vapors may be diverted to the transfer line so that both vapors from the coker and catalytically cracked products are passed through the transfer line with the coke and the feed to assist in vaporizing the feed.

It will also be understood that while the U-bends 227, 235, 249, 251, and 253 are desirable flow control conduits for the solids passing therethrough, they may be replaced with standpipes and risers, dilute phase lines, V-bends, etc., as will be apparent to those skilled in the art.

Other modifications may be made and some of the elements, e. g. heat exchanger 212, may be omitted in some installations, as will readily be apparent. The feed preferred is unreduced crude oil because the vaporizer system, with many crudes, makes it unnecessary to perform topping operations in conventional stills. However, a lightly topped crude may also be fed through the system if desired and it will be understood that reference to crude oil feed or to feed stocks of wide boiling range may include either. Lines for fluidizing or aerating gases which are omitted from the drawing for simplicity obviously will be supplied where necessary, as this technique is well understood in the art.

The high surface area presented by the hot solids in the vaporizer zone expedites the vaporization of the more volatile constituents of the feed and the short contact time inhibits degradation particularly of the virgin products. Flow rates of solids and feed are, of course, to be regulated to keep the system in balance as will also be apparent to those skilled in the art.

What is claimed is:

1. The process of upgrading hydrocarbon oil of wide boiling range which comprises rapidly feeding a stream of coke particles at a temperature between 1000 and 1400° F. through a transfer line, injecting the feed into said stream to substantially volatilize its constituents boiling within and below the gas oil range within a short time so as to avoid substantial cracking of said constituents, whereby higher boiling non-solid constituents are substantially deposited on said coke particles, separating the volatilized constituents from the coke particles, feeding the deposit bearing coke particles to a coking zone, adding preheated coke particles which are substantially free of non-solid deposits and at a temperature of at least 1000° F. to said zone, fluidizing all said particles in said zone for an average residence time of 0.5 to 30 minutes and an average temperature of 850° to 1100° F. in the coking zone to convert at least a portion of the oil deposits to vapor products, catalytically cracking said vapor products and passing at least a portion of the cracked products formed thereby through the transfer line with the coke and feed to assist in vaporizing said feed, removing the spent coke from said coking zone, stripping occluded vapors therefrom, passing the stripped coke to a burner, and contacting said coke with air in said burner to reheat it.

2. Process according to claim 1 wherein part of the coke from the stripper is mixed with part of the coke from the burner, and the mixture is fed to the transfer line to obtain a coke mixture of optimum temperature for vaporizing the feed to the transfer line.

3. Process according to claim 1 wherein at least part of the coker vapor products are passed through the transfer line with the coke and feed to assist in vaporizing said feed.

4. A process of coking and cracking viscous hydrocarbon oil which comprises coking said oil in a coking zone containing inert particles and thereafter catalytically cracking the volatile coker products of said oil in quick succession without condensation of the coker products, withdrawing the gaseous and entrained liquid products from said cracking operation to a flash zone, introducing fresh oil feed and hot catalytically inert particles at 1000° to 1400° F. into said flash zone with said products, separating the flashed vapors thus produced from the solids, fractionating said vapors, returning the bottoms therefrom to the coking zone, and recycling the inert particles to the coking zone.

5. Process according to claim 4 wherein the flashed vapors are cooled by heat exchange before fractionation.

References Cited in the file of this patent

UNITED STATES PATENTS

| | | |
|---|---|---|
| Re. 17,181 | McEwen | Jan. 1, 1929 |
| 2,445,328 | Keith | July 29, 1948 |
| 2,471,119 | Peck et al. | May 24, 1949 |
| 2,485,315 | Rex et al. | Oct. 18, 1949 |
| 2,527,575 | Roetheli | Oct. 31, 1950 |
| 2,543,884 | Weikart | Mar. 6, 1951 |
| 2,598,058 | Hunter | May 27, 1952 |
| 2,655,464 | Brown et al. | Oct. 13, 1953 |
| 2,661,324 | Leffer | Dec. 1, 1953 |
| 2,670,322 | Krebs et al. | Feb. 23, 1954 |
| 2,733,282 | Drews et al. | Jan. 31, 1956 |